July 4, 1961

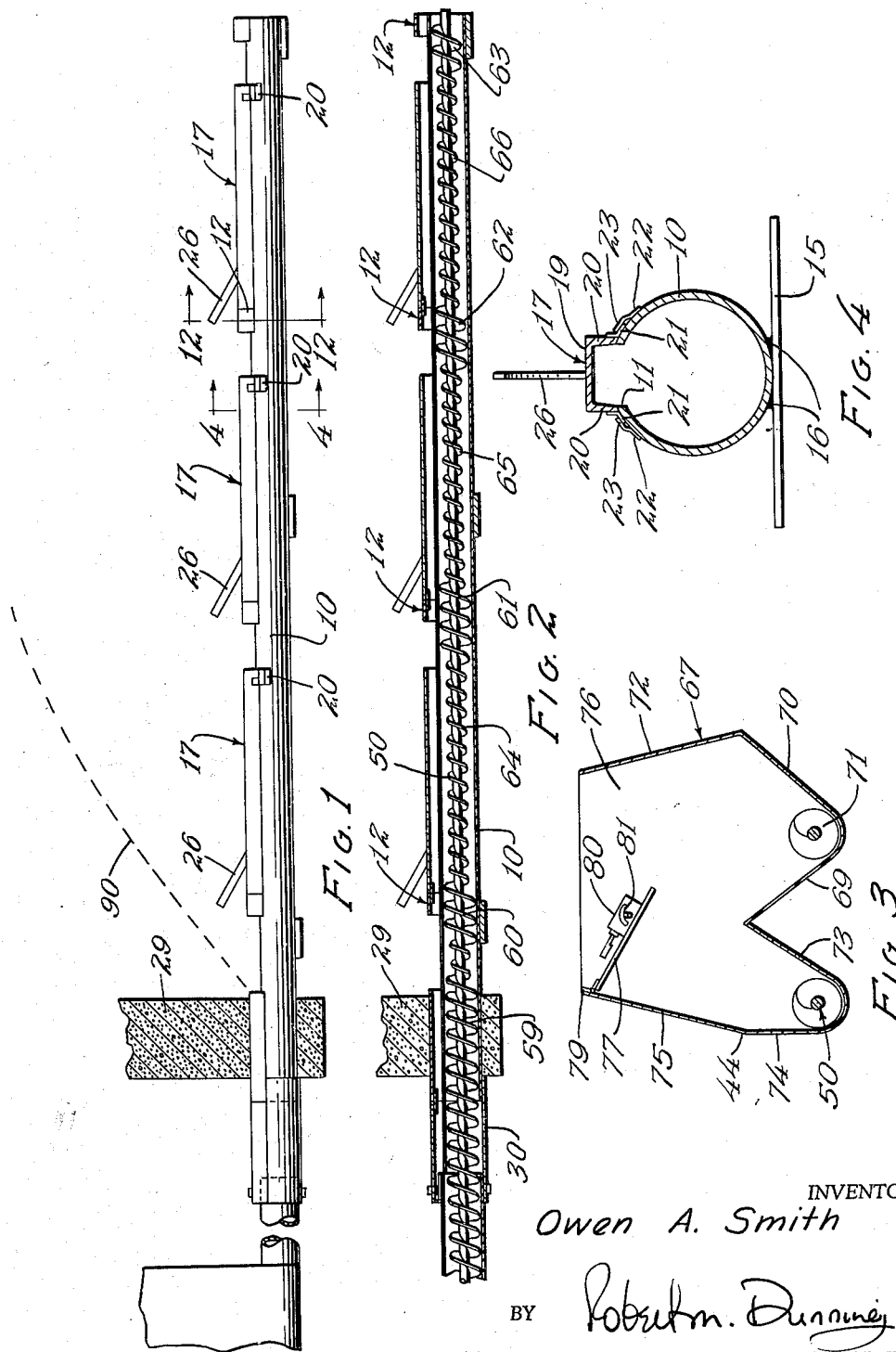

O. A. SMITH 2,990,942

COAL CONVEYOR

Filed Oct. 21, 1957

INVENTOR
Owen A. Smith

BY *[signature]*

ATTORNEY

2,990,942
COAL CONVEYOR
Owen A. Smith, 1819 Emerson Ave. S.,
Minneapolis, Minn.
Filed Oct. 21, 1957, Ser. No. 691,236
8 Claims. (Cl. 198—214)

This invention relates to an improvement in coal conveyors and deals particularly with a conveyor useful in delivering coal from a coal bin to a stoker. Some difficulty is experienced in conveying coal from a coal bin to a stoker. Stokers of the type used in commercial plants use considerable quantities of coal and it is usual practice to store this coal in a convenient bin capable of holding a very considerable quantity of fuel. In some instances in the past, a screw conveyor has been placed in a trough at the bottom of the bin into which the coal may drop by gravity. If the conveyor extends entirely across the bin so as to be able to convey the coal even when the bin is almost empty, the screw conveyor is subjected to tremendous strain when the bin is full due to the weight of the coal and due to the large amount of coal in the conveyor. If, on the other hand, the conveyor extends only a short distance into the bin, coal must be moved manually into the conveyor when the bin is partially empty.

A feature of the present invention resides in the provision of a coal conveyor including a screw type conveyor element which is rotatably mounted in a tubular enclosure having a slotted upper extremity to permit fuel to enter. Covers are mounted to close the upper portion of the tubular enclosure throughout most of the length of the conveyor so as to allow a restricted area beneath the pile of coal through which the coal may drop into the interior of the conveyor enclosure. These covers are arranged in longitudinally spaced sections and each section is individually removable. As a result, more and more of the covers may be removed as the size of the coal pile decreases thereby gradually permitting the coal to enter the enclosure as less and less of the conveyor is covered.

A feature of the present invention resides in the fact that the covers are provided with handles secured thereto to extend in a direction toward the outlet end of the conveyor. These handles are designed to extend from the pile of coal to be accessible before a section of the cover is exposed. By grabbing this handle and properly operating the cover, the cover may be removed from beneath the edge of the pile of coal thus opening this portion of the conveyor enclosure and permitting additional coal to drop into the conveyor.

A further feature of the present invention resides in the provision of a conveyor having a series of removable covers which are supported in spaced relation so as to provide spaced openings beneath the pile of coal through which a small amount of coal may flow at all times when the corresponding part of the conveyor enclosure is beneath the pile of coal. As a result, there was always a load upon the outer end of the conveyor and some coal is always in motion beneath the pile of coal so as to provide a more uniform load upon the screw conveyor.

It is therefore a feature of the present invention to provide a means of metering or regulating the amount of coal available for the screw conveyor to pick up. As a result, the conveyor may be employed in coal bins where the coal is substantially more than five feet in depth without danger that the weight of the coal upon the screw conveyor will not cause the conveyor to feed more than its rated capacity and so that the conveyor will not jam up in any part of the conveyor enclosure.

A further feature of the present invention resides in the provision of a screw conveyor including conveyor portions which are varied in pitch and in diameter so as to provide an even flow of coal in the auger housing. The conveyor is so constructed as to provide short sections of large diameter screw conveyor alternated with smaller diameter sections thereof. The conveyor enclosure is provided at points spaced throughout its length with connecting bridges which span the slot in the top of the enclosure and act to hold the enclosure from spreading. The large diameter portions of the conveyor are positioned inwardly of these bridging portion so that the screw conveyor is held centered in the housing and prevents coal from building up on the bottom of the conveyor housing as would be possible if the conveyor was not properly centered therein.

A further feature of the present invention resides in the fact that the screw conveyor or auger is so constructed that it may be removed even though it is buried beneath a pile of coal. The conveyor is made in more than one section so connected that the drive end can be disengaged from the remainder of the conveyor and the main body of the conveyor may be pulled from its enclosure even though it is beneath a large pile of coal. The auger may be repaired and replaced by inserting it and rotating it so as to screw the auger into whatever coal is within the enclosure.

A feature of the present invention resides in the provision of a novel form of separable joint which permits two parts of the auger to be easily detached. The abutting ends of the auger sections are provided with axial sockets, one of which anchors a pin of stainless steel or the like. This pin engages in the socket in the other part of the auger. The flights of the auger sections are cut radially and abut together. This arrangement provides a continuous and unbroken flight, as compared with other structures in which the flight ends are overlapped. A flat steel strip is welded or otherwise secured to one flight to project beyond the radial edge thereof. This strip overlaps the abutting portion of the adjoining flight and the parts may be held together by means of a bolt of stainless steel or the like. Thus, the sections of the auger are held in proper alignment and are held for rotation in unison.

A further feature of the present invention resides in the provision of an obstruction removal plate at the location where the auger enters the coal bin wall. The open top of the auger housing extends beneath this plate and the plate may be removed for the separation of any foreign material from the coal. Throughout the major portion of the length of the conveyor, the channel-shaped covers and the channel-shaped clean out plate provide a passage through which elongated foreign materials may pass without jamming the conveyor.

An added feature of the present invention resides in the fact that the conveyor is provided with a reverse flight at its extremity which prevents the coal from being forced against the transfer case. As a result the coal builds up in height in the end of the transfer case and normally drops by gravity into the feed hopper.

A further feature of the present invention resides in the provision of a thrust and pull bearing of hard wood at the drive end of the auger which has been impregnated in paraffin and which is capable of resisting very material force and wear and not damaged by coal dust. Other porous materials, such as porous bronze, may be similarly impregnated with a lubricant and employed.

Still another feature of the present invention resides in the provision of an overfill switch above the transfer case and hopper so that in the event the stoker drive shall fail to operate properly, the hopper will not continue to fill up through continued movement of the conveyor.

These and other objects and novel features of the present invention will be more clearly and fully set forth in the following specification and claims.

In the drawings forming a part of the specification:

FIGURE 1 is a side elevational view of the coal conveyor showing the general arrangement thereof.

FIGURE 2 is a vertical sectional view through the conveyor, the conveyor screw or auger being shown in full lines.

FIGURE 3 is a sectional view through the transfer case and coal hopper showing a typical installation where the conveyor is on the same plane as the stoker.

FIGURE 4 is a sectional view through a portion of the conveyor enclosure, the position of the section being indicated by the lines 4—4 of FIGURE 1.

Figure 5:
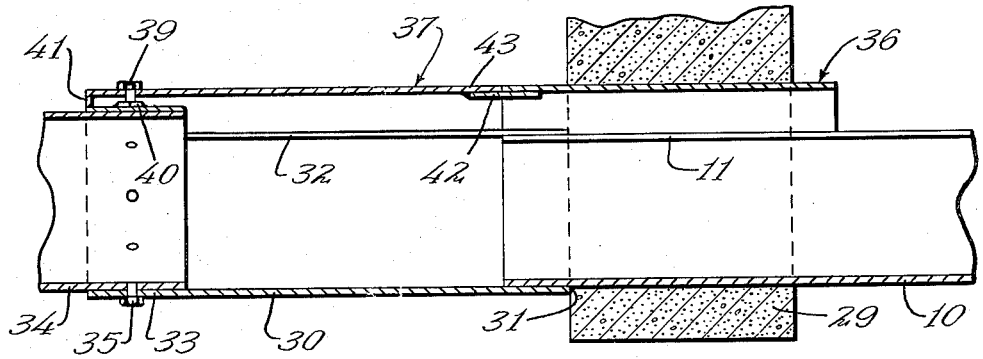
FIGURE 5 is an enlarged sectional view showing the removable obstruction removal plate near the end of the conveyor enclosure.

Conveyors of the type in question are capable of being mounted in various positions to suit different installations. For example, in some instances the stoker is mounted below the level of the floor of the coal bin. In such a case the coal conveyor may feed directly into the top or side of the stoker hopper. In the present case, both the stoker and the conveyor are mounted on a common level and a transfer case is attached to the hopper to deliver the coal thereto from the end of the conveyor.

As is indicated in the drawings the conveyor includes an elongated hollow tubular enclosure 10 which is provided with a slot or opening 11 at its upper extremity. This opening extends throughout the length of the main portion of the tubular enclosure 10. Inverted U-shaped angle members 12 form bridging connections between opposite sides of the slot 11 at intervals throughout the length thereof. These angle members 12 include a top portion 13 and downwardly extending side flanges 14 which are welded or otherwise secured to the tubular member 10 on opposite sides of the slot 11.

As is indicated in FIGURE 4 of the drawings, the elongated tubular enclosure 10 is provided with a transversely extending foot portion 15 which is welded to the enclosure to extend transversely thereof. These feet, which are shown connected to the tubular enclosure 10 at the point 16 hold the enclosure with the slot 14 uppermost.

A large portion of the top of the conveyor enclosure is normally closed by a series of removable covers 17. Each cover 17 comprises a body of channel shaped section which is arranged with the base of the channel uppermost. As is evident from FIGURE 4 of the drawings, each cover 17 includes a top panel 19 and downwardly projecting flanges 20 on opposite edges thereof. Means are provided for holding the covers 17 in their proper location. This means includes short angle brackets 21 secured to the flanges 20 near one end thereof and shaped to fit in surface contact with the outer surface of the tubular enclosure 10. Brackets 22 having ends 23 which are offset from the surface of the enclosure 10 are welded to this enclosure, these brackets being on opposite sides of the slot 11 and arranged in properly spaced relation throughout the length of the tubular enclosure 10. The angle brackets 21 engage beneath the offset ends 23 of the brackets 22 upon longitudinal sliding movement of the cover on the enclosure 10 in a direction toward one of the bridges 12.

Figure 11:
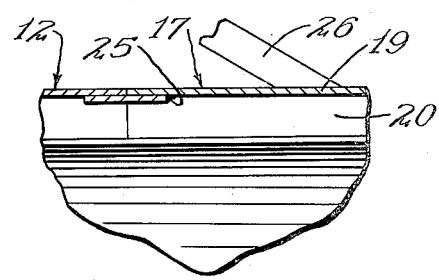
FIGURE 11 is an enlarged sectional view showing the connection between one of the removable covers and the means for holding the cover in place.
Figure 12:
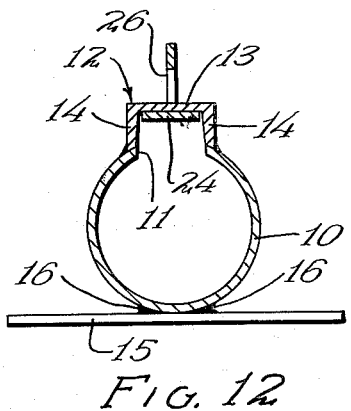
FIGURE 12 is a sectional view on the line 12—12 of FIGURE 1.

As is indicated in FIGURE 11 of the drawings the undersurface of each of the cover panels 19 of a cover member 17 is provided with a projecting strip 24 which is welded to the cover member 17 at 25. As is indicated in FIGURE 12 of the drawings, this strip 24 is designed to extend into the bridging member 12 to properly locate the cover member with respect to the conveyor enclosure. A handle 26 is welded or otherwise secured to each of the cover members 17 to extend upwardly from the top panel 19 and preferably inclined toward the outlet end of the conveyor. The covers may be manipulated by operation of the handles 26. The cover members are mounted upon the conveyor at a time when no coal overlies the portion of the conveyor being covered and each cover member is applied by placing it in position to bridge the slot 11 of the conveyor enclosure 10 between a pair of spaced bridge members 12 and then pulling the cover member toward the outlet end of the conveyor to engage the strip 24 beneath the bridging member 12 and to engage the angular clips 21 beneath the offset ends 23 of the brackets 22.

It will be noted from an examination of FIGURE 1 of the drawings that the cover members 17 do not extend the full distance between the spaced bridging members 12 thereby providing apertures at intervals throughout the length of the conveyor. Due to the restricted size of these apertures, the amount of coal which will flow therethrough is limited and will not place an undue burden upon the auger. At the same time, the conveyor is operating at all times to some extent throughout its length thus equalizing the strain upon the screw conveyor.

The conveyor enclosure 10 usually extends through a wall 29 of the coal bin and into the stoker room. A sleeve 30 telescopes over the end of the enclosure 10 and is welded thereto as indicated at 31. The tubular member 30 is provided with a slot 32 through the major portion of its length forming a continuation of the slot 11. However, the extremity of the sleeve 30 as indicated at 33 is completely tubular and accommodates the end of a hollow cylindrical enclosure continuation 34. The continuation 34 is secured in place within the cylindrical end of the sleeve 30 by means of bolts 35 or other suitable connecting means.

Figure 6:
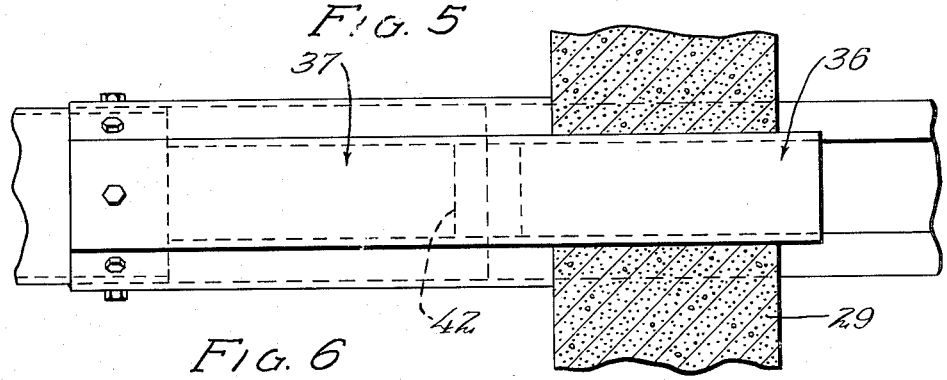
FIGURE 6 is a top plan view of the structure shown in FIGURE 5, a portion of the wall being illustrated in section.

As is indicated in FIGURES 5 and 6 of the drawings, an inverted channel-shaped member 36 overlies the portion of the enclosure 10 which extends through the wall 29 forming a continuation of the enclosures formed by the various removable covers and the bridging members 12. A removable inspection door 37 is provided which is somewhat similar in nature to the covers 17. The member 37 comprises a channel shaped element with its base uppermost and extends in abutting relation to the channel 36 to overlie the slot 32 in the sleeve 30. A bolt 39 or other fastening means extends through the base of the channel 37 and into a nut 40 which is welded or otherwise secured to the sleeve 33. The channel member 37 is provided with an end closure 41 shaped to fit the curvature of the sleeve 33 and at its opposite ends includes a projecting strip 42 which is welded or otherwise secured at 43 to the base of the channel 37 and which projects into the end of the channel 36. This strip 42 holds the two in alignment but permits removal of the channel 37 when the bolt 39 is removed.

Figure 7:
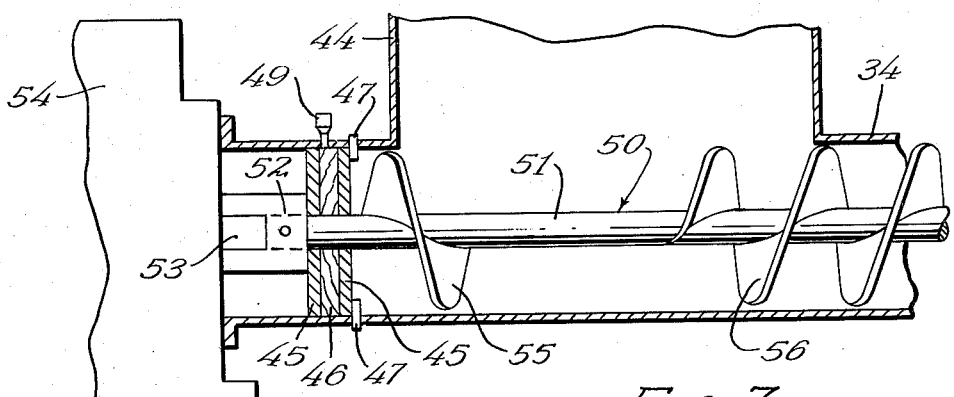
FIGURE 7 is a vertical section through the transfer case and bearing supporting the end of the conveyor screw or auger.

The end structure of the conveyor enclosure is best illustrated in FIGURE 7 of the drawings. The hollow sleeve 34 extends into a transfer case 44 which is attached to the stoker hopper in a manner which will be later described. A pair of steel discs 45 confine a wooden bearing disc 46 which is impregnated with a lubricant such as paraffin or the like. The discs and plates are held in place by retaining pins 47 or other suitable means and an oil cup 49 may be provided exteriorly of the wooden disc to permit added lubricant to be applied. Other porous material capable of being impregnated with a lubricant may be used in place of wood.

Figures 8, 9:
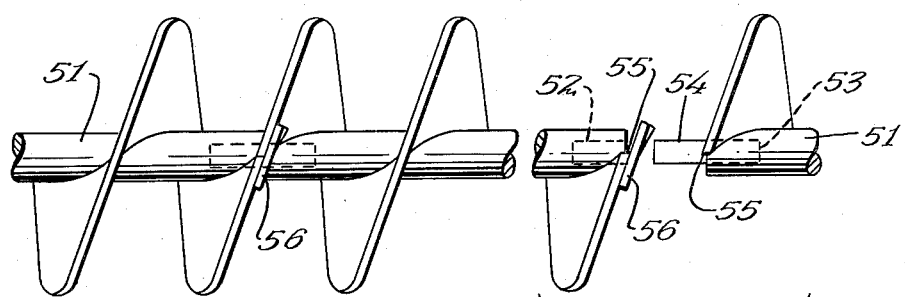
FIGURE 8 is a side elevational view of a joint between two auger sections.
FIGURE 9 is a view similar to FIGURE 8 showing the two sections in separated condition.
Figure 10:
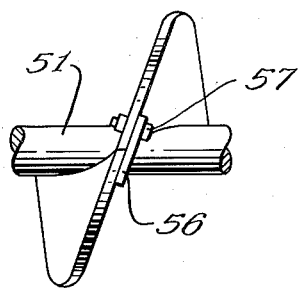
FIGURE 10 is a view similar to FIGURE 8 showing a slightly modified form of construction.

The screw conveyor or auger is indicated in general by the numeral 50 and includes a conveyor shaft 51 which extends through the discs 45 and 46 axially thereof. The end of the shaft 51 is provided with a collar 52 which is notched to engage the end of a cooperable coupling member 53 driven by suitable drive mechanism within the power transmission 54. Preferably, the conveyor is formed in more than one section and the conveyor section which is within the transfer case 44 includes a reverse flight portion 55 which is spaced from the end of the forward flight portion 56. The manner in which the conveyor sections are connected together is indicated in FIGURES 8 and 9 of the drawings. As is indicated in these figures, the sections of the shaft 51 which are to fit together are both socketed, one end including a socket 52 and the other end including a socket 53. A pin 54 of stainless steel or the like is wedged in one socket such as 53 and engages in the other socket 52 with a running fit.

The ends of the two conveyor flights terminate along radial planes 55 through the axis of the shaft 51 and the flight of one section abuts against the flight of the other section when the two parts are engaged. A metal strip 56 is welded to the back side of one flight and is designed to overlap a portion of the adjoining flight. By abutting the flight ends, a continuous flight is provided, differing from structures in which the ends of the flight sections are overlapped. As all of the longitudinal strain upon the conveyor tends to pull the conveyor to the right as viewed in the drawings, the conveyor sections are held from separation by the strip 56. However, if any added insurance against separation or relative rotation between the two parts is desired, a bolt 57 may extend through the projecting end of the strip 56 and through the flight of the conveyor which it overlaps.

As is best indicated in Figure 2 of the drawings, the conveyor 50 varies in pitch and in diameter throughout its length, and is usually provided with a large diameter portion 59 which is enclosed within the sleeve 30 and within the portion of the conveyor enclosure 10 which extends through the wall 29. The portion of the conveyor between the wall 29 and the closest bridging member is 12 is shown as being of small diameter but a larger diameter portion 60 is provided inwardly of the first bridging portion 12. Similar enlarged diameter portions 61, 62 and 63 are shown lying inwardly of the various bridging members 12. The purpose of this arrangement is to provide a good bearing for the conveyor at the points where the conveyor enclosure is strongest. Obviously, the conveyor enclosure is strongest at the points where the slot 11 is bridged by the bridging members 12 and accordingly the larger diameter portions 60, 61, 62 and 63 are inwardly of the various bridge members while the intermediate portions 64, 65 and 66 of the conveyor are of smaller diameter. This arrangement prevents the jamming of the conveyor as the coal is carried throughout the length thereof while the larger diameter conveyor portions tend to prevent any build-up of coal within the conveyor, by preventing the auger from getting off center.

With reference now to Figure 3 of the drawings, the transfer case 44 is shown as connected to the stoker hopper 67. The stoker hopper 67 is usually provided with tapering lower sides 69 and 70 which slope toward the stoker conveyor 71. Normally the stoker is provided with upwardly extending sides 72 to permit a supply of fuel to be placed in the hopper. One of the sides 72 of the hopper is cut away and the sloping wall 69 is connected to the upper edge of the sloping wall 73 of the transfer case 44. The outer wall 74 of the transfer case is provided with an upward continuation 75 which extends to the height of the side wall 72 and is connected to an extension of the end 76 of the hopper.

Means is provided for stopping the operation of the conveyor 50 when the hopper tends to overfill. For example, if the feed screw 71 of the stoker should fail to function properly, and the conveyor screw 50 continues to operate, the hopper would naturally overflow. This is prevented by the use of a plate 77 which is hingedly connected at 79 to the transfer plate walls 75 and which supports a junction box 80 including a mercury switch 81. The mercury switch 81 is normally in a position to make the circuit to the conveyor motor which operates the transmission case 54. The mercury tube 81 is preferably curved with the ends of the tube lower than the center to provide a differential between stop and start. Minor agitation of the plate 77 will therefore not actuate the switch. However, in the event the hopper tends to overfill, the coal bears against the undersurface of the plate 77, tilting this plate upwardly. As this action takes place, the mercury switch 81 is tilted to an extent sufficient to break the circuit to the conveyor motor until the level of coal in the hopper has decreased.

It is believed that the operation of the apparatus can be easily understood from the description already given. After the conveyor is installed the various covers 17 are put into place to be held in place by the angle clips 21 and the projecting strips 24. Each cover abuts a bridging member 12 leaving an opening between the other end of the cover and the next bridging member through which coal may drop.

After the coal has been inserted in the bin the coal may drop into the conveyor and be conveyed into the stoker. As the coal is used, the pile of coal assumes an angle such as is indicated by the dotted line 90 and the level of coal in the pile gradually drops until the handle 26 of the cover 17 nearest the outlet end of the conveyor is exposed.

At this point, the handle 26 may be grasped and the first cover may be removed thus increasing the space available for the coal to drop nearest the outlet end of the conveyor. The angle which the coal assumes remains substantially constant. As the coal is gradually used, the covers are removed one at a time until the coal in the bin is substantially depleted or the bin is again refilled.

In accordance with the patent statues, I have described the principles of construction and operation of my improvement in coal conveyors, and while I have endeavored to set forth the best embodiment thereof, I desire to have it understood that changes may be made within the scope of the following claims without departing from the spirit of my invention.

I claim:
1. A stoker conveyor including an elongated tubular enclosure having a product receiving slot extending longitudinally thereof, a series of covers overlying said slot, respective means normally holding the ends of each cover in proper spaced relation overlying said slot, both of said respective holding means for each cover acting in a direction to prevent lateral displacement thereof and one of said holding means acting to prevent longitudinal displacement in one direction whereby each of said covers is individually removable when manually shifted in an opposite longitudinal direction, and a screw conveyor extending through said enclosure.

2. A conveyor structure including an elongated tubular enclosure having a longitudinally extending product receiving slot in its upper surface, a series of bridging members bridging said slot at spaced intervals longitudinally of said enclosure, a series of covers overlying said slot between said bridging members, said covers being shorter than the distance between said bridging members to provide product receiving apertures between said covers, cooperable means on said enclosure and on said covers for releasably holding said covers in fixed position overlying said slot, and a screw conveyor in said enclosure having portions thereof closely adjacent both the upper and lower surfaces of said enclosure.

3. The construction described in claim 2 and including cooperable means between said covers and said bridging members for assisting in holding said covers in proper relation overlying said slot.

4. The construction described in claim 2 and in which said screw conveyor includes large diameter portions of slightly smaller diameter than the interior of said tubular enclosure and intermediate smaller diameter portions, said large diameter portions being located inwardly of said bridging members and relatively close thereto and said smaller diameter portions being in a spaced relation beneath said covers and also in a spaced relation above the bottom of said tubular enclosure.

5. The construction described in claim 2 and in which said bridging members are channel shaped in cross section and are secured with the bases of the channels uppermost and the sides of the channel extending downwardly into contact with said enclosure on opposite sides of said slot, and in which said covers are similarly shaped in cross section, one end of each cover having a projecting member for underlying a bridging member to releasably anchor said one end in place, said cooperable means being near the other end of each cover.

6. The construction described in claim 5 and including a handle on each of said covers extending upwardly therefrom at a locus near said one end and angled toward the outlet end of the conveyor.

7. A conveyor for use in conjunction with a coal bin and a stoker, said conveyor including an elongated tubular enclosure supported on the base of the coal bin and extending through the coal bin wall, said enclosure having a slot in its upper surface through which coal may pass, a series of bridging members connecting opposite sides of said slot in said enclosure at spaced intervals longitudinally thereof, said bridging members being substantially channel shaped in cross section with the base portion uppermost, a series of removable covers of similar cross sectional shape to said bridging members and overlying said slot, cooperable means on said covers and said enclosure for normally holding said covers in a longitudinally spaced relation to said enclosure, said last named means being disengageable to permit removal of said covers, a channel-shaped member of similar cross section to said bridging members overlying the portion of said conveyor extending through said wall, and an inspection cover overlying said enclosure on the side of the wall opposite from the coal bin, said inspection cover being of a cross section similar to said bridging members and secured in an overlying relationship with the end of said slot.

8. A conveyor structure including an elongated tubular enclosure having a longitudinally extending product receiving slot in its upper surface, a series of covers overlying said slot, means for maintaining said covers in an individually releasable and longitudinally spaced relationship, and a screw conveyor comprising large diameter portions of slightly smaller diameter than the interior of said tubular enclosure and intermediate smaller diameter portions, said smaller diameter portions underlying the slot openings formed by the longitudinal spacing of said covers and being disposed above the bottom of said tubular enclosure.

References Cited in the file of this patent

UNITED STATES PATENTS

| | | |
|---|---|---|
| 1,785,287 | Ryan et al. | Dec. 16, 1930 |
| 1,867,573 | Leach | July 19, 1932 |
| 2,038,471 | Benatar | Apr. 21, 1936 |
| 2,131,305 | Shaw | Sept. 27, 1938 |
| 2,225,215 | Guthrie | Dec. 17, 1940 |
| 2,369,370 | Scholl | Feb. 13, 1945 |
| 2,815,852 | Harrer | Dec. 10, 1957 |